March 26, 1940. H. W. DEVLIN Re. 21,408

KEY CUTTER

Original Filed April 25, 1933

Inventor:
Henry W. Devlin
By
Rollander, McGrew & Campbell
Attorneys

Reissued Mar. 26, 1940

Re. 21,408

UNITED STATES PATENT OFFICE 21,408

KEY CUTTER

Henry Wayne Devlin, Sacramento, Calif., assignor to A. K. Underwood, Denver, Colo.

Original No. 1,958,235, dated May 8, 1934, Serial No. 667,781, April 25, 1933. Application for reissue December 15, 1939, Serial No. 309,447

11 Claims. (Cl. 164—50)

This invention relates to a hand operated key cutter, and has for its principal object, the provision of a simple and compact cutting device which can be operated with one hand; which will accurately cut the tumbler pin notches at the proper spacing, and to the proper depth; which can be of use for accurate duplication of keys according to code numbers, and which will occupy no more space than an ordinary pair of pliers.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Figure 1:
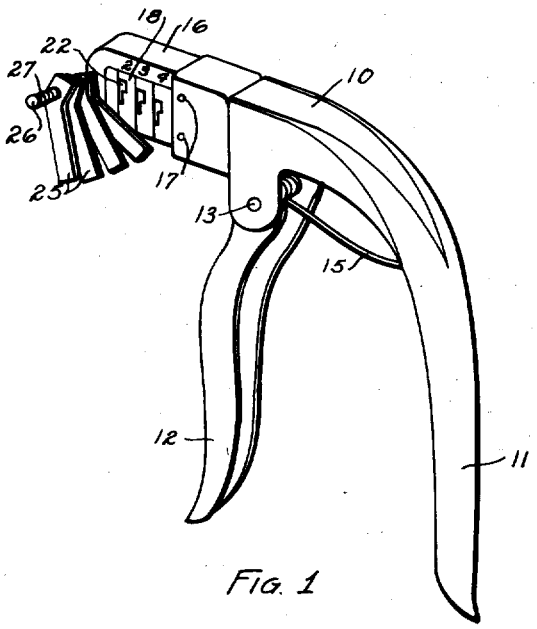
Fig. 1 is a perspective view illustrating the improved key cutter.

The invention preferably comprises a hollow frame or hand-grip member 10 terminating in a stationary handle 11. A movable handle 12 is pivoted in the frame member 10 upon a suitable pivot pin 13. The upper extremity of the movable handle extends within the frame 10 to form a bifurcated operating lever 14. A coil spring 15 is positioned about the pivot pin 13, with its extremities arranged to constantly urge the two handles 11 and 12 apart.

A cutting head extends forwardly from the frame 10. It consists of a key block frame 16 which may be formed, as illustrated, with an inverted U-shaped outline. One extremity of the key block frame 16 is permanently riveted into the frame member 10 by means of suitable rivets 17, or it may be otherwise secured therein. The frame 16 is arranged to enclose any desired number of key guide blocks 18. The device, as illustrated, is designed to cut pin notches of three different depths and contains three of the key guide blocks 18 along which a key is moved. Above each of the guide blocks an index numeral is stamped into the block frame 16, as indicated by the numerals 2, 3, and 4 on the drawing.

The guide blocks are maintained in place by means of a cutting rod 19 which extends entirely through the block frame 16 and through each of the guide blocks 18 therein. The outer extremity of the cutting rod is provided with an adjustable stop nut 20. The inner extremity terminates in a rectangular hinge block 21 which is snugly fitted between the furcations 14 of the operating lever 12 and which is secured therein by means of a suitable hinge pin 21*a*.

It will be noted that each of the key guide blocks 18 is formed with a horizontal key way 22 extending entirely across the block. The key ways 22 in the adjacent blocks are positioned at different heights, that is, the key way of block 2 is higher than the key way of blocks 3 and 4.

A notch 23 is formed in the cutting rod at each point where it intersects one of the key ways 22. The notches 23 may be of varied depth corresponding to the varying elevations of the key ways in the key blocks, or, if desired, they may be all of the same depth. In the latter case, the notches must have a depth equal to that of the deepest notch or corresponding to the key way of the lowest elevation. The stop nut 20 should be adjusted to bring the notches 23 into alignment with the key slots.

It can be readily seen that if a key blank, such as the one indicated at 24, is inserted in one of the key ways 22, and the handles are compressed, the cutting rod 19 will act to punch or cut a notch in the key edge. This notch formed keyway 2 will be of relatively less depth than the notch which would be formed if the key were inserted in key block 3 or 4, owing to the differing elevations of the keyways. Therefore, the operator can obtain a notch of any of three different depths.

The notches can be accurately positioned at the proper tumbler positions along the key by means of a series of tumbler spacing stops 25 which are hinged upon a pin 26 extending from the block frame 13. The spacing stops 25 are clamped together so as to frictionally engage each other by means of a compression spring 27, which is positioned against the outer arm and the head of the pin 26. The frictional engagement of the arms serves to maintain them in any desired position. When swung to a horizontal position beneath the keyways 22, the stops 25 will be engaged by a shoulder 28, with which each key blank is provided, so as to limit the distance the key may be inserted in the keyway 22, thus holding the key in a selected position with reference to the keyway and the cutting member.

Figure 6:
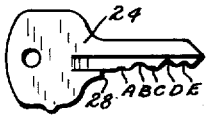
Fig. 6 illustrates a key cut with this improved key cutter.
Figure 3:
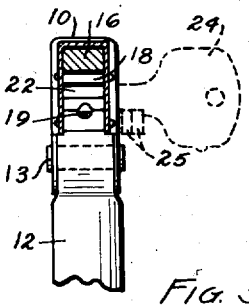
Fig. 3 is a cross section through the cutting head taken on the line 3—3, Fig. 2.
Figure 2:
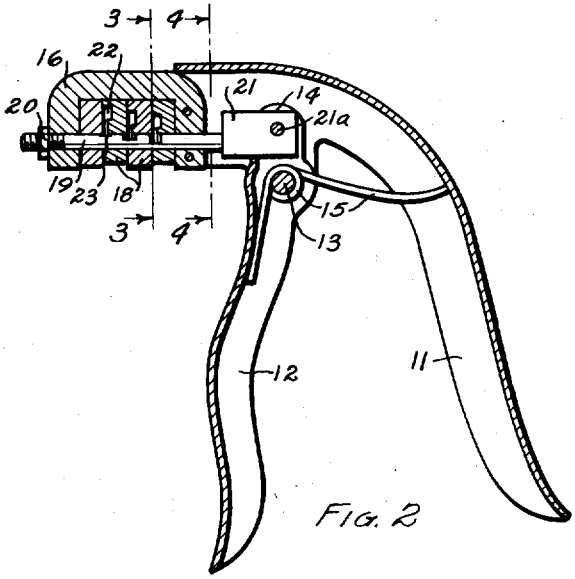
Fig. 2 is a longitudinal section therethrough illustrating the interior mechanism.
Figure 4:
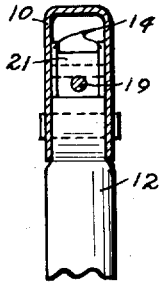
Fig. 4 is a cross section through the frame head, taken on the line 4—4, Fig. 2.

Let us assume it is desired to duplicate the key illustrated in Fig. 6. The key blank is first inserted in keyway 2, with the stops 25 swung out of the way so that the key may be inserted its full length before the shoulder 28 strikes the key block 18. The handles are compressed and the shallow notch *a* is cut. The innermost stop 25 is now swung to a horizontal position and the key is inserted into keyway 3 until the shoulder 28 strikes the first stop 25. The handles are compressed and the medium notch B is cut. The second stop 25 is now swung into position and the shallow notch C is cut in the keyway 2. The third stop is swung into position and the deep notch D is cut in keyway 4, as shown in broken line in Fig. 3. The fourth stop 25 is now swung into position and the medium notch E is cut in keyway 3. The resulting key is perfect both as to pin depth and tumbler spacing.

Figure 5:
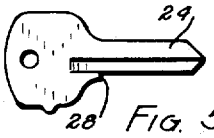
Fig. 5 illustrates a typical key blank.

While the keyways illustrated are designed to receive single groove keys of the type illustrated in Fig. 5, it is to be understood that the different key blocks may be inserted in place of the blocks 18, having keyways contoured to fit different types of keys.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A key cutter comprising: a key guide member having a keyway extending therethrough for receiving a key; a cutting member extending through said guide member at right angles to said keyway; means for projecting said cutting member across said keyway so as to cut a notch from a key therein; means for limiting the amount of insertion of said key in said keyway to any one of a series of predetermined points comprising a series of stop members and means for allowing said stop members to be selectively brought into contact with said key.

2. A key cutter comprising a frame member; a stationary handle projecting from said frame member, a movable handle hinged to said frame member; key guide members carried by said frame member, each provided with a keyway; a cutting member extending through said key guide members and intersecting the keyways therein; a hinged connection between said cutting rod and said movable handle so that as said handle is operated, said rod will be projected across said keyways, there being a notch formed in said cutting rod at the points of intersection of each key channel.

3. A key cutter comprising a frame member; a stationary handle projecting from said frame member; a movable handle hinged to said frame member; key guide members carried by said frame member, each provided with a keyway; a cutting member extending through said key guide members and intersecting the keyways therein; a hinged connection between said cutting rod and said movable handle so that as said handle is operated, said rod will be projected across said keyways, there being a notch formed in said cutting rod at the points of intersection of each key channel; and means for stopping the insertion of said key in said key channels at a predetermined point.

4. A key cutter comprising a frame member; a stationary handle projecting from said frame member; a movable handle hinged to said frame member; key guide members carried by said frame member, each provided with a keyway; a cutting member extending through said key guide members and intersecting the keyways therein; a hinged connection between said cutting rod and said movable handle so that as said handle is operated, said rod will be projected across said keyways, there being a notch formed in said cutting rod at the points of intersection of each key channel; and means for stopping the insertion of said key in said key channels at a predetermined point; said latter means comprising a series of independent stop members adapted to be swung to a position opposite the entrance of said key channels.

5. A key cutter comprising: a frame member; a stationary handle projecting from said frame member; a movable handle hinged to said frame member so as to coact with said stationary handle to form a hand grip; guide blocks provided with keyways supported from said frame member, the keyway in each block being at a different elevation from the keyways in its adjacent blocks; a cutting rod passing through all of said blocks and intersecting the keyways therein; and an operable connection between said cutting rod and said movable handle.

6. A key cutter comprising a hand-grip member, a key guide on the member having a keyway therethrough, a movable cutter extending through said guide member, a handle pivotally attached to said hand-grip member for projecting the cutter across the keyway, and means for limiting the degree of insertion of a key into said keyway with reference to the cutting member to any one of a number of predetermined positions.

7. A key cutter comprising a hand-grip member, a key guide on the member having a keyway therethrough, a movable cutter extending through said guide member, a handle pivotally attached to said hand-grip member for projecting the cutter across the keyway, and means inclusive of a stop for limiting the degree of insertion of a key into said keyway to a predetermined position with reference to said cutting member.

8. A key cutter comprising a hand-grip member, a key guide on the member having a keyway therethrough, a movable cutter extending into said guide member, a handle pivotally attached to said hand-grip member for projecting the cutter across the keyway, resilient means positioned to oppose pivotal movement of the handle, means inclusive of a stop for limiting the degree of insertion of a key into said keyway to a predetermined position with reference to said cutting member, and means for bringing the stop into operative contact with a key.

9. A key cutter comprising a hand-grip member, a key guide carried on the member, a key cutting member positioned adjacent the path of a key being moved along the guide member, a handle pivotally connected with the hand-grip member for projecting the cutting member across the path of a key so moved, resilient means positioned to oppose pivotal movement of the handle, and means inclusive of a series of stops for selectively limiting the movement of a key along the guide member to any one of a number of predetermined positions with reference to said cutting member.

10. A key cutter comprising a hand-grip member, a key guide on the member having a keyway therethrough, a movable cutter extending into said guide member, a handle pivotally attached to said hand-grip member for projecting the cutter into the keyway, resilient means positioned to oppose pivotal movement of the handle, and means for holding a key in a predetermined position in the keyway.

11. A key cutter comprising a hand-grip member, a key guide on the member having a keyway, a movable cutter extending into said guide member, a handle pivotally attached to said hand-grip member for projecting the cutter across the keyway, resilient means positioned to oppose pivotal movement of the handle, and means for selectively positioning a key in said key guide with reference to the cutter.

HENRY WAYNE DEVLIN.